US011455567B2

(12) United States Patent
Sengupta et al.

(10) Patent No.: US 11,455,567 B2
(45) Date of Patent: Sep. 27, 2022

(54) RULES ENGINE FOR SOCIAL LEARNING

(71) Applicant: International Business Machines Corporation, Armonk, NY (US)

(72) Inventors: Bikram Sengupta, Bangalore (IN); Prasenjit Dey, Bangalore (IN); Padmanabha Venkatagiri Seshadri, Mysore (IN); Aditya K. Sinha, Bangalore (IN); Chalapathy Neti, Yorktown Heights, NY (US); Satyanarayana V. Nitta, Westchester, NY (US); Ravindranath Kokku, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1052 days.

(21) Appl. No.: 16/127,547

(22) Filed: Sep. 11, 2018

(65) Prior Publication Data

US 2020/0082301 A1   Mar. 12, 2020

(51) Int. Cl.
*G06N 20/00* (2019.01)
*G09B 19/00* (2006.01)
*A63H 33/26* (2006.01)
*G06N 7/00* (2006.01)

(52) U.S. Cl.
CPC ............ *G06N 20/00* (2019.01); *A63H 33/26* (2013.01); *G06N 7/005* (2013.01); *G09B 19/00* (2013.01)

(58) Field of Classification Search
CPC ........ G06N 20/00; G06N 7/005; A63H 33/26; G09B 19/00
See application file for complete search history.

(56) References Cited

U.S. PATENT DOCUMENTS

| | | | |
|---|---|---|---|
| 2010/0153353 A1* | 6/2010 | Angell | G06N 5/04 707/705 |
| 2011/0047025 A1* | 2/2011 | Demir | G06Q 30/0256 705/14.54 |
| 2012/0083182 A1 | 4/2012 | Heatherly et al. | |
| 2012/0109707 A1* | 5/2012 | Hickey | G06Q 10/06313 705/7.23 |
| 2015/0138333 A1 | 5/2015 | Devaul et al. | |
| 2015/0360139 A1 | 12/2015 | Watry | |
| 2015/0381409 A1* | 12/2015 | Margalit | H04L 41/0631 709/221 |
| 2017/0274289 A1 | 9/2017 | Judkins et al. | |

(Continued)

OTHER PUBLICATIONS

Anonymous; "Cloud Pets"; <https://www.cloudpets.com/>; Saved from the World Wide Web on Jun. 29, 2018; 5 pages.

(Continued)

*Primary Examiner* — David E Choi
(74) *Attorney, Agent, or Firm* — Cantor Colburn LLP; Joseph Petrokaitis

(57) ABSTRACT

A computer-implemented method for a socially connectable agent. A non-limiting example of the computer-implemented method includes receiving, by a processor, input events. The method includes evaluating and enacting rules, by the processor, based on the received input events, where the rule include stochastic elements and temporal operators. The method pushes, by the processor, action events that result from the evaluation and enactment of the rules, and initiates, by the processor, action events.

20 Claims, 7 Drawing Sheets

(56) References Cited

U.S. PATENT DOCUMENTS

2019/0111422 A1* 4/2019 Molina .................. G06N 3/002
2020/0082301 A1* 3/2020 Sengupta ............... A63H 33/26

OTHER PUBLICATIONS

Anonymous; "Connected Smart Toys from Cognitoys—Meet STEMosaur"; <https://cognitoys.com/>; Saved from the World Wide Web on Jun. 29, 2018; 11 pages.
Anonymous; "Cozmo | Meet Cozmo"; <https://www.anki.com/en-us/cozmo>; Saved from the World Wide Web on Jun. 29, 2018; 6 pages.
Anonymous; "FEN Learning"; <http://www.fen.com/about.html>; Saved from the World Wide Web on Jun. 29, 2018; 6 pages.
Anonymous; "Introduction—ProbLog: Probabilistic Programming" <https://dtai.cs.kuleuven.be/problog/ 8/>; Saved from the World Wide Web on Aug. 16, 2018; 5 pages.
Anonymous; "Little Pim—Language-Learning-Kids-Method"; <https://www.littlepim.com/>; Saved from the World Wide Web on Jun. 29, 2018; 7 pages.
Anonymous; "Marbotic | Wooden connected toys & educational apps for tablets"; <http://www.marbotic.fr/>; Saved from the World Wide Web on Jun. 29, 2018; 6 pages.
Anonymous; "Maze | DIY Virtual Reality"; Seedling <https://www.seedling.com/collections/maze-virtual-reality-for-kids>; Saved from the World Wide Web on Jun. 29, 2018; 3 pages.
Anonymous; "Mursion—Education and Learning Industry"; <https://mursion.com/industries/education.html>; Saved from the World Wide Web on Jun. 29, 2018; 5 pages.
Anonymous; "Pi Lab—Edwin the Duck"; <https://www.edwintheduck.com/>; Saved from the World Wide Web on Jun. 29, 2018; 5 pages.
Anonymous; "Play-Doh TOUCH Shape to Life Studio"; <https://www.apple.com/shop/product/HKJ92LL/A/play-doh-touch-shape-to-life-studio>; Saved from the World Wide Web on Jun. 29, 2018; 4 pages.
Anonymous; "PlayOsmo"; <https://playosmo.com/en/pizza-co/>; Saved from the World Wide Web on Aug. 16, 2018; 4 pages.
Anonymous; "Silk—Embed Instant Cognition into Your Next Product"; <https://www.silklabs.com/>; Saved from the World Wide Web on Jun. 29, 2018; 4 pages.
Anonymous; "simSchool Teacher Training Platform"; <http://www.simschool.org/>; Saved from the World Wide Web on Jun. 29, 2018; 8 pages.
Anonymous; "Sphero | Connected Toys"; <https://www.sphero.com/>; Saved from the World Wide Web on Jun. 29, 2018; 7 pages.
Anonymous; "Stikbot Studio"; <https://play.google.com/store/apps/details?id=com.zingglobal.stikbot&hl=en>; Saved from the World Wide Web on Aug. 16, 2018; 3 pages.
Anonymous; "TeddyMozart | Be present with your voice from afar with TeddyMozart"; <https://teddymozart.com/>; Saved from the World Wide Web on Jun. 29, 2018; 14 pages.
Anonymous; "Tiggly | Interactive Toys & iPad Learning Apps for Kids"; <https://www.tiggly.com/>; Saved from the World Wide Web on Jun. 29, 2018; 6 pages.
Anonymous; "TipiTap—Children's early education for your touch-screen worlds"; <http://www.tipitap.com/>; Saved from the World Wide Web on Jun. 29, 2018; 2 pages.
Baig; "Mattel's Aristotle is like an Amazon Echo for kids"; USA TODAY; Jan. 3, 2017; 2 pages.
Basulto; "AI-enabled toys: Hello Barbie is now connected to Wifi—and can chat back"; The Independent UK; Nov. 4, 2015; 11 pages.
Choi; "The Best Connected Toys: A 2016 Gift Guide"; <https://www.forbes.com/sites/jennchoi/2016/12/14/the-best-connected-toys-a-2016-gift>; Dec. 14, 2016; 9 pages.
Giles et al.; "The 17 Best STEM Toys That Teach Kids to Code (for Toddlers to Teens)"; Working Mother; Jun. 5, 2017; 18 pages.
McReynolds et al.; "Toys that Listen: A Study of Parents, Children, and Internet-Connected Toys"; CHI 2017; May 6-11, 2017; Denver, CO, USA; 11 pages.
Mell et al.; "The NIST Definition of Cloud Computing—Recommendations of the National Institute of Standards and Technology"; US Department of Commerce—National Institute of Standards and Technology; Sep. 2011; 7 pages.
Parker; "Current State of the Art in Distributed Autonomous Mobile Robotics"; Washington.edu-Courses; 2009; 10 pages.
Venkatagiri et al.; "Puppeteer: De-centralized Platform For Connected-Yet-Autonomous Educational Toys"; 2018 10th International Conference on Communication Systems & Networks (COMSNETS); Jan. 3-7, 2018; 8 pages.
Wilson; "Lego's New Coding Kit Lets You Program Your Toys To Fart"; <https://www.fastcompany.com/3068175/legos-new-coding-kit-lets-you-program-your-toys>; Feb. 15, 2017; 11 pages.
Aschermann; "Children Teaching and Learning in Peer Collaborative Interactions"; Dissertation—Virgina Tech, 2001 <https://theses.lib.vt.edu/theses/available/etd-04252001-140637/unrestricted/Thesis.pdf>; 87 pages.
Bandura; "Social Learning Theory"; General Learning Press, 1971 <http://www.esludwig.com/uploads/2/6/1/0/26105457/bandura_sociallearningtheory.pdf>; 46 pages.
Blatchford et al.; "Improving the Effectiveness of Pupil Groups in Classrooms"; Research Report—Reference No. L139 25 1046 <http://www.leeds.ac.uk/educol/documents/189786.pdf>; Jun. 2005; 14 pages.
Tharp et al.; "Rousing Minds to Life : Teaching, Learning, and Schooling in Social Context"; ResearchGate Article, Nov. 1989; 13 pages.
Vygotsky; "Mind in Society—The Development of Higher Psychological Processes"; Harvard University Press, 1978; 26 pages.
Zhang et al.; "Improving Children's Competence as Decision Makers: Contrasting Effects of Collaborative Interaction and Direct Instruction"; American Educational Research Journal, Feb. 2016, vol. 53, No. 1; 30 pages.

* cited by examiner

RULES ENGINE FOR SOCIAL LEARNING

STATEMENT REGARDING PRIOR DISCLOSURES BY THE INVENTOR OR A JOINT INVENTOR

The following disclosure is submitted under 35 U.S.C. 102(b)(1)(A): DISCLOSURE: Puppeteer: De-Centralized Platform For Connected-Yet-Autonomous Educational Toys, Venkatagiri, Seshadri Padmanabha, et al., 2018 10th International Conference on Communication Systems & Networks (COMSNETS), Jan. 3-7, 2018, 8 pages.

BACKGROUND

The present invention generally relates to networked computer sensing systems, and more specifically, to systems and methods for a rules engine for social learning.

Connected devices for education represent a new generation of Internet-of-Things ("IoT") enabled devices that combine the physicality of a play mate with the digital enablement and control afforded by sensors, networks and applications. Such devices can respond to stimuli from the environment or be controlled through apps. They are rapidly diversifying in their capability from racing cars to robots and drones. Connected devices toys come loaded with content and activities that can be periodically refreshed from the cloud. They learn from their interactions with the environment to get smarter and improve user experience with time.

SUMMARY

Embodiments of the present invention are directed to a computer-implemented method for a socially connectable agent. A non-limiting example of the computer-implemented method includes receiving, by a processor, input. The method includes evaluating and enacting rules, by the processor, based on the received input events, where the rule include stochastic elements and temporal operators. The method pushes, by the processor, action events that result from the evaluation and enactment of the rules. The processor initiates action events received.

Embodiments of the present invention are directed to a system for a socially connectable agent. A non-limiting example of the system includes a memory and a processor coupled to the memory. The processor is operable to execute instructions stored in the memory. The instructions cause the processor to receive input events. Rules are evaluated and enacted based at least in part on the received input events, where the rules include stochastic elements and temporal operators. Action events that result from the evaluation and enactment of the rules are pushed. Action events received are initiated.

Embodiments of the present invention are directed to a computer program product for a socially connectable agent. A non-limiting example of the computer program product includes a computer readable storage medium having program instructions embodied therewith, wherein the computer readable storage medium, as used herein, is not to be construed as being transitory signal per se. The program instructions are executable by a computer, to cause the computer to perform a method including receiving, by a processor, input events from and evaluating and enacting rules, by the processor, based on the received input events, where the rule include stochastic elements and temporal operators. The method pushes, by the processor, action events that result from the evaluation and enactment of the and initiates, by the processor, action events received.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
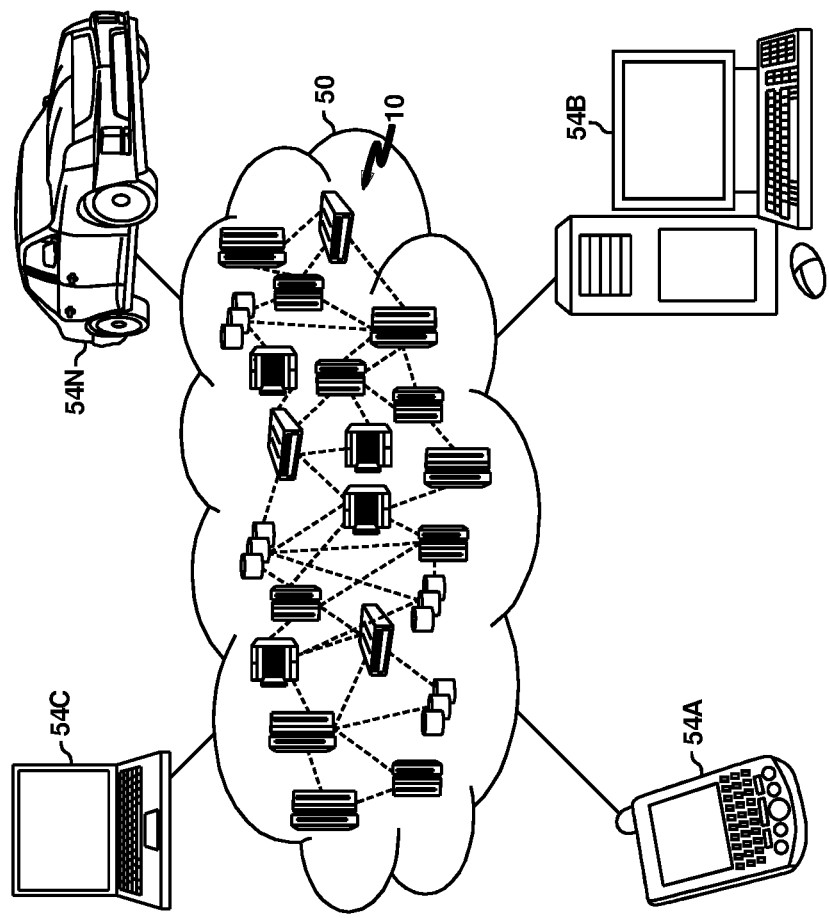
FIG. 1 depicts a cloud computing environment according to an embodiment of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
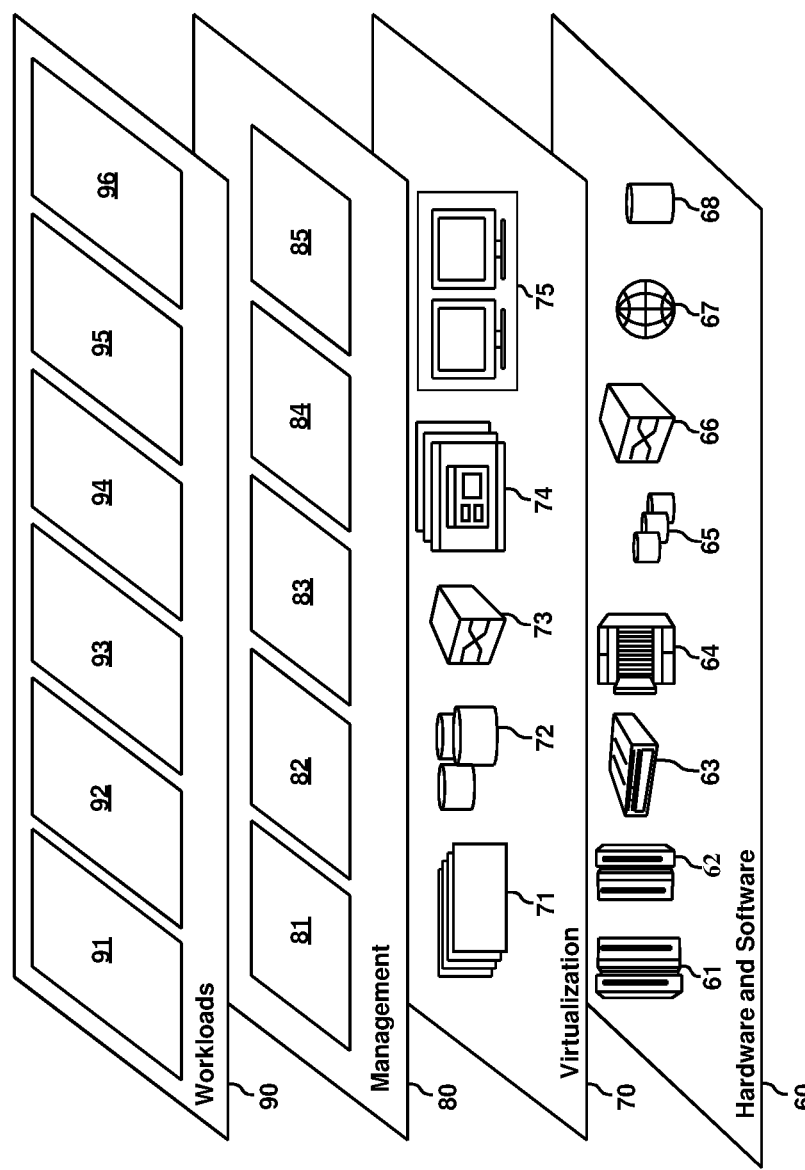
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and social learning using connected toys 96.

Turning now to an overview of technologies that are more specifically relevant to aspects of the invention, the social nature of learning has deep implications for educational toys and games. There is a need to create much richer learning environments for children if along with the teacher toy, there are multiple peer learner toys with various personality types and cognitive capabilities that manifest a variety of interesting behaviors in a classroom setting. These toys not only directly interact with the child learner (as connected toys do), but they also interact with each other to create novel situations and experiences from which the child will observe and learn. Together, they encourage and challenge a child on the learning journey, as well as directly or indirectly reinforce good behaviors and assist in well-rounded personality development. These toys are known as socially connected toys to emphasize the interactions they engage in as a group to create a social learning environment for a child. While socially interactive toys have existed, such toys failed to operate within the context of a conversation to track conversation paths to influence stochastic rule enactment.

Turning now to an overview of the aspects of the invention, one or more embodiments of the invention address the above-described shortcomings of the prior art by providing a set of distributed physical agents (or toys) that autonomously interact with other agents (toys or humans) to facilitate discovery of objectives through a process of contextual and stochastic enactment of toy-specific rules.

The above-described aspects of the invention address the shortcomings of the prior art by providing context of conversations to social learning toys. By providing context, the conversations and interaction between toys and humans is greatly enriched. Context is provided through having temporal operators, which are operators that hold true over time. Some temporal operators include, for example: Next E—the event E happens the next time-step; E1—happened before E2—E1 occurred sometime before E2; E1 until E2—E1 remains true until E2; and Global E—E holds always. Other temporal operators could also be used.

Social learner services may be provided, which are services that may be used to instantiate connected toys as a teacher or as peer learners. Each toy can be given certain behavioral, cognitive, and affective attributes that can be drawn from a pool of stochastic models that are part of the platform. These models can be developed by experts such as child psychologists, teachers and early childhood learning researchers. These may also be learnt from human behavior in social learning situations where the signals are measured from sensors on the human body and in the environment and then labeled by humans to construct or train models Behavioral models encompass various personality types, interaction models for those types, as well as vocabulary. For example, for a shy personality type, the interaction model may specify a low probability of responding to a question posed by the teacher, while a friendly personality type will have a high probability of appreciating the child learner when he provides a correct response.

Machine learning artificial intelligence ("AI") systems embody different learning capabilities of early childhood learners. For example, a connected toy with a Smart model has a high probability of correctly responding to difficult questions, or to bring up new concepts related to what is being covered in a session. There are also Affect models to simulate emotional states/responses.

Similarly, teachers may be assigned various personality models that would influence different aspects of a teacher's engagement with the class such as the teacher's friendliness towards the students or the teacher's patience/tolerance levels, for example.

Pedagogic and cognitive capabilities are assigned to a teacher at a high level (through suitable training mechanisms) since that is the instrument for imparting learning to the class.

Situation models represent a variety of common situations that may arise in a session (e.g. related to behavior or learning), and intervention models outline ways to address these situations. For example, a situation model for a noisy class is modeled as a set of co-occurring speaking events, where each event may come from a learner toy, followed by an intervention by the teacher; such models may be pre-scribed, or learnt through supervised methods. The intervention model for a noisy class situation prescribes a spoken intervention from the teacher to restore order, for example. At runtime, these models are instantiated and monitored to support classroom activities.

Learner models and situation models are now described. A behavioral model represents a persona's probability to demonstrate various behaviors in different situations. For example, when a teacher asks a question, a shy person may have a low probability of volunteering an answer; when a student provides an incorrect answer, a disagreeable person may have a higher probability than others of being rude. Cognitive and affective models may be similarly specified. For example, when a teacher asks a difficult question, a smart person would have a high probability of providing a correct answer. A persona's overall engagement in the class will be driven by the person's behavioral, cognitive and affective models.

Session planner services are next described. Session planner services are used to define the goals of a learning session, an approach to work towards those goals, and update social learner models for the session. These leverage long-term goals for the learner (set by a human stakeholder, for example) that include a combination of learning and behavioral goals, for example, <mastery of topic X>, <reduced shyness in answering questions>, and <improved handling of unfavorable behavior>. New goals can be added to an existing list automatically based on evaluating the learner's participation during social learning sessions and observing gaps in cognition or behavior. Given a set of goals and the current learner models, session planner services instantiate the learning goals and social learner models (e.g. number of participating toys and their models) for the session to enable accelerated progress towards the goals.

For example, <mastery of topic X>triggers the creation of an optimal pathway towards X starting from the learner's current cognitive model. In an adaptive learning style, this involves a sequence of content and assessments of topics in X's pre-requisite path. However, it would also appropriately instantiate cognitive attributes on learner toys so that questions/answers on such topics are enhanced to impart additional knowledge to the learner. As other examples, <reduced shyness in answering questions> may lead to a higher number of questions from a teacher toy to be directed to the learner, while <improved handling of unfavorable behavior> may increase the possibility of unfriendly/disagreeable behavior in the session. The initial plan may be arrived at through an optimization over multiple goals to have the right proportion and sequence of activities (cognitive, behavioral) within the session duration. The plan may be dynamically optimized based on updates to the learner models during the session.

Turning to social learning services, such services are used to run a learning session involving a group of socially connected toys. Session orchestration services help execute the session plan by, for example, a sequence of content and assessments delivered by a teacher towards the defined learning goals. Activity identification services assist connected learners to identify and track the current learning activities as a session progresses. Engagement services define the participation of the individual learners in the session, both behaviorally as well as cognitively, as per their learner models and session attributes. Situation monitoring services are used to analyze the interactions of the toys and the child and to identify any emerging situations that warrant attention. These situations can be both desirable (e.g. a learner performing very well) or undesirable (e.g. a behavior that needs to be discouraged/reprimanded). Intervention services are used to intervene in a manner appropriate to the situation. Learner state services are used to update the state of the learners—both cognitive as well as affective—as they proceed through the session. Insight services provide feedback on the session in terms of goals attained and learnings reinforced, as well as to provide recommendations for subsequent sessions. Many other services can be added to customize the sessions further or enhance learning experience, for example, retention services to control the amount of history learners retain on a session or cohort services that allow the creation of smaller groups (e.g. a child and a peer toy) to work together on specific activities and so on.

This specification will use the term "toys" and "agents" interchangeably. A "toy" is a type of "agent" specific to a device used to interact or play with children. An "agent" could be a "toy" or could encompass broader concepts such as robots. Anything described as a toy could apply equally well to an agent, or vice-versa.

There are many use cases for using these socially connected toys. In a first use case, the socially connected toys could be used in education. Group play of children with toys is an excellent opportunity to impart education through social learning. Consider such a scenario, wherein children play with a set of toys. The toys act as intelligent, autonomous toys which interact with peer toys in the group and with children to enact a social scenario which imparts specific learning to children. The scenario could involve toy-toy, toy-child and child-child dialogues exhibiting social learning catalysts like motivation, competition, cajoling, incentives, and entertainment to play the foil and break the monotony of learning.

In a second use case, the toys could be used for humanoid socialization. With pervasive automation picking up, Humanoid (human like) robots are set to enter the society. But, one of the important challenges of a human-humanoid co-existence is to design humanoids to exhibit the idiosyncrasies that humans normally exhibit in nature. The most popular conception of this vision is the "Data" humanoid introduced in Star Trek—The Next Generation TV series.

Humanoids could participate in group talk, banter, exhibit gait and gesture variations relevant to a context to blend into human groups smoothly.

In a third case, the toys could be animoids. Robotic toys mimicking animal behavior could be a very useful tool to learn animal societies. For this robotic toys will enact specific scenarios producing some variations specific to the animal group to elicit behavioral reactions from the animals under study. Some examples are gestural variations in showing teeth, raising tail, making specific communicating sounds, and changing color in co-ordination with other toys to observe what would be the third-person reaction to such sub-group interactions.

Distributed physical toys: in the first use case, toys are the distributed toys. In the second use case it is humanoid robots and in use case 3 it is animoid robots. The toys are independent physical devices which are specially separated and have to communicate to co-ordinate and interact to effect change in the context. Additionally, these toys are hardware units (like IoT nodes) which might have to survive on limited resources such as battery and limited network bandwidth.

Autonomous interactions: In most use cases, it's desirable for the toys to have the ability for autonomous interaction. This is because, the toys often find themselves separated from the backhaul infrastructure often. This means they need to possess the ability to operate adaptively. For instance, toys are moved around by children and played with in both indoor and outdoor setting. Humanoid robots have to operate in both urban and rural environments. Animoids will have to operate in forests.

Discovering objectives: If the nodes are autonomous and distributed, then it follows that there is little or no control over their availability. This means the objectives of the scenario for which the toys have been deployed need to be discovered dynamically based on how the toy-specific profiles/rules manifest. For instance, toys could be separated from the group when children play. Sometimes rough play could cause the toys to fail. Humanoid robots will also have to be mobile resulting in group formation and fragmentation. The same happens with animoid robots where chances of failure are high due to harsh usage and terrain.

Stochastic enactment: When toy profiles/rules manifest, there is a requirement for all use cases that there is some variation by introducing some deliberate uncertainty in the rule outcome. For instance, if the child beats toy-1, and it keeps responding (Eg. the rule/profile for the toy-1 contains the rule child-beat implies speak-out "don't beat me") "don't beat me", it would appear more mechanical and less natural. On the other hand, if toy-2 or toy-3 picks up the same event and speaks out "don't beat toy-1" once in a while in addition to the original behavior, it appears more natural to the child. This stochasticity in enactment of profiles/rules embodying the toy is desirable in the use cases similar to the illustrations.

Figure 3:
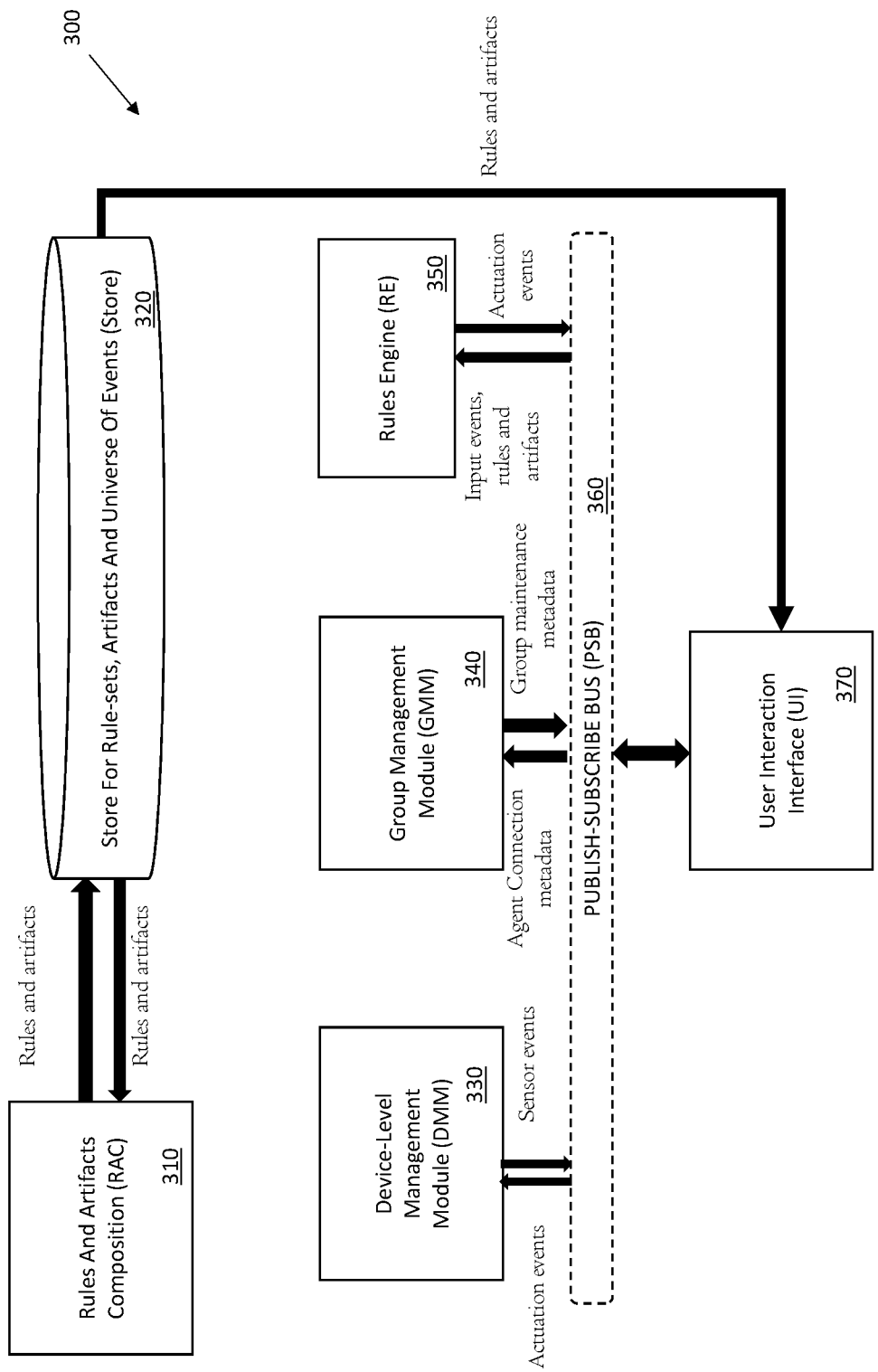
FIG. 3 depicts a system level diagram of an exemplary socially connected toy 300 according to embodiments of the invention.

Turning now to a more detailed description of aspects of the present invention, FIG. 3 depicts a system level diagram of an exemplary socially connected toy 300 according to embodiments of the invention. We will introduce the functional models here, but they will be described in greater detail in the timing diagrams and flow charts that follow. Each of these modules is present in every toy, so that each toy may operate in a stand-alone environment separated from other toys. Rules and Artifacts Composition ("RAC") block 310 is for a user to compose rules and artifacts. Rules are probabilistic logic programming paradigms augmented with temporal operators. Artifacts are actions taken based on the rule, or, in other words, the output of a rule.

A typical rule-set involves a set of atomic facts and probabilistic rules. A set of probabilistic atomic facts of the form probability-of-enactment: event-label. Provided is a sample rule-set for use case 1 below the next two paragraphs. A typical probabilistic event-label has the form: [actor]-[action]-[artifact-expression], which depicts the actor, action taken by the actor and artifact to be used as part of the action. The content expression is a regular expression which provides a set of content to choose from. For instance, consider 0.4: [ambient noise]-[play]-[noise.mp4]. Here, the actor is ambient noise, being played out is the action and the audio file which produces this noise is provided by specific content noise.mp4. The probability this event gets enacted is 0.4.

A set of probabilistic rules of the form probability-of-enactment:: actuation-event :- logical-expression. The rule's logical-expression gets evaluated based on the events it is made up of. Once the expression is satisfied, the system schedules the actuation-event for enactment with probability-of-enactment. For instance, in the below paragraph, consider rule 0.9: [disagreeable person]-[responds]-[OOC $(Q_1)$] :- ([smart person]-[answers]-[A$(Q_1)$]]V [inquisitive]-[answers]-[A$(Q_1)$]]). Actuation event, [disagreeable person] tresponds]-[OOC$(Q_1)$] (disagreeable person responds with an out-of-context comment from the set of such comments in the context of question 1) gets enacted with probability-of-enactment 0.9, if the logical-expression ([smart person]-[answers]-[A$(Q_1)$]] V [inquisitive]-[answers]-[A$(Q_1)$]]) becomes true.

Facts 0.4: [ambient noise]-[playHnoise.mp3]

\>: [teacher]-[asks_question]-[$Q_1$]

\>: [smart person]-[answers]-[A(Q1)]

\>: [inquisitive]-[answersHA($Q_1$)]

\>: [disagreeable person]-[responds]-[OOC(Q1)]

Rules 0.8: [teacher]-[asks_question]-[$Q_1$] :- start 0.5: [smart person]-[answers]-[A(Q1)]] :- [teacher]-[asks_question]-[Q1]

0.5: [inquisitive]-[answersHA($Q_1$)]] :- [teacher]-[asks_question]-[q_1]

0.9: [disagreeable person]-[responds]-[OOC(Q1)]

:- ([smart person]-[answers]-[A(Q1)]] V [inquisitive]-[answers]-[A(Q1)]])

Artifacts (e.g. dialogue text, video, gesture pattern etc.) are composed as structured text-like JSON as shown below. Below illustrates a sample artifact question unit, with corresponding answer set, out-of-context remarks and probability distribution on the respective sets.

```
{
Id: Q₁
Value: "Who were the Cholas?"
A(Q₁): {"Cholas.mp4", "South Indian Royalty", "Indians?",
"I don't know"}
PDF(A(Q₁)): {0.4, 0.3, 0.2, 0.1}
OOC(Q₁): {"I want to go home", "Can we play?", "Haven't the
foggiest idea"}
PDF(OOC(Q₁)): {0.5, 0.3, 0.2}
}
```

The following is the list of logical and temporal operators: operators that are used as part of the rule (in the logical-expression):

Boolean operators like logical-and, logical-or, logical-xor, logical-not which connect events instantaneously. For instance, in the previous rule set, for ([smart person]-[answers]-[A(Q1)]] V [inquisitive]-[answers]-[A(Q1)]]) to be true, either of individual events [smart person]-[answers]-[A(Q1)]] and [inquisitive]-[answers]-[A(Q1)]] have to be true instantaneously.

Temporal operators are operators which hold over time. Some of them are listed below for sample events E1, E2, E:
Next E: The event E happens in the next time-step
E1 happened-before E2: E1 occurred sometime before E2
E1 until E2: E1 remains true until E2
Global E: E holds always More operators could be added as required without altering the framework.

Returning to FIG. 3, the Rules and Artifacts are stored in a Store for Rule-sets, Artifacts, and Universe of Events ("Store") 320. A User Interaction Interface ("UI") interfaces 370 with a PC or tablet, for example, to compose and edit the Rules and Artifacts. UI 370 also allows a user to interact with the toy 300 to pull out the stored rules and artifacts and to select, either manually or automatically, assignments to toys.

The Device Level Management Module ("DMM") 330 initializes on-board sensors and actuators and publishes their availability on a publish-subscribe bus ("PSB") 360, so that other toys can share them. DMM 330 also advertises toy presence or activations on PSB 360. DMM 330 listens to changes in peer toy status on PSB 360. The DMM 330 listens to the PSB 360 for actuation events and initiates actuations that would result from the actuation events.

Group Management Module ("GMM") 340 maintains agent or toy connection metadata, i.e., what toys are currently interacting with each other. GMM 340 also monitors maintenance issues for the group of connected toys.

Rules Engine ("RE") 350 receives rules and artifacts and use them for enactment during runtime. RE 350 listens to input events off the PSB 360. The RE evaluates and stochastically enacts the rules based on events received and system state. The outcome of this is a set of actuation events. If RE 350 receives changes to peer toy status (say the toy has left the group), it alters the enactment process to compensate for the toy dropping off. The RE 350 pushes actuation events to PCB 360.

Figure 4:
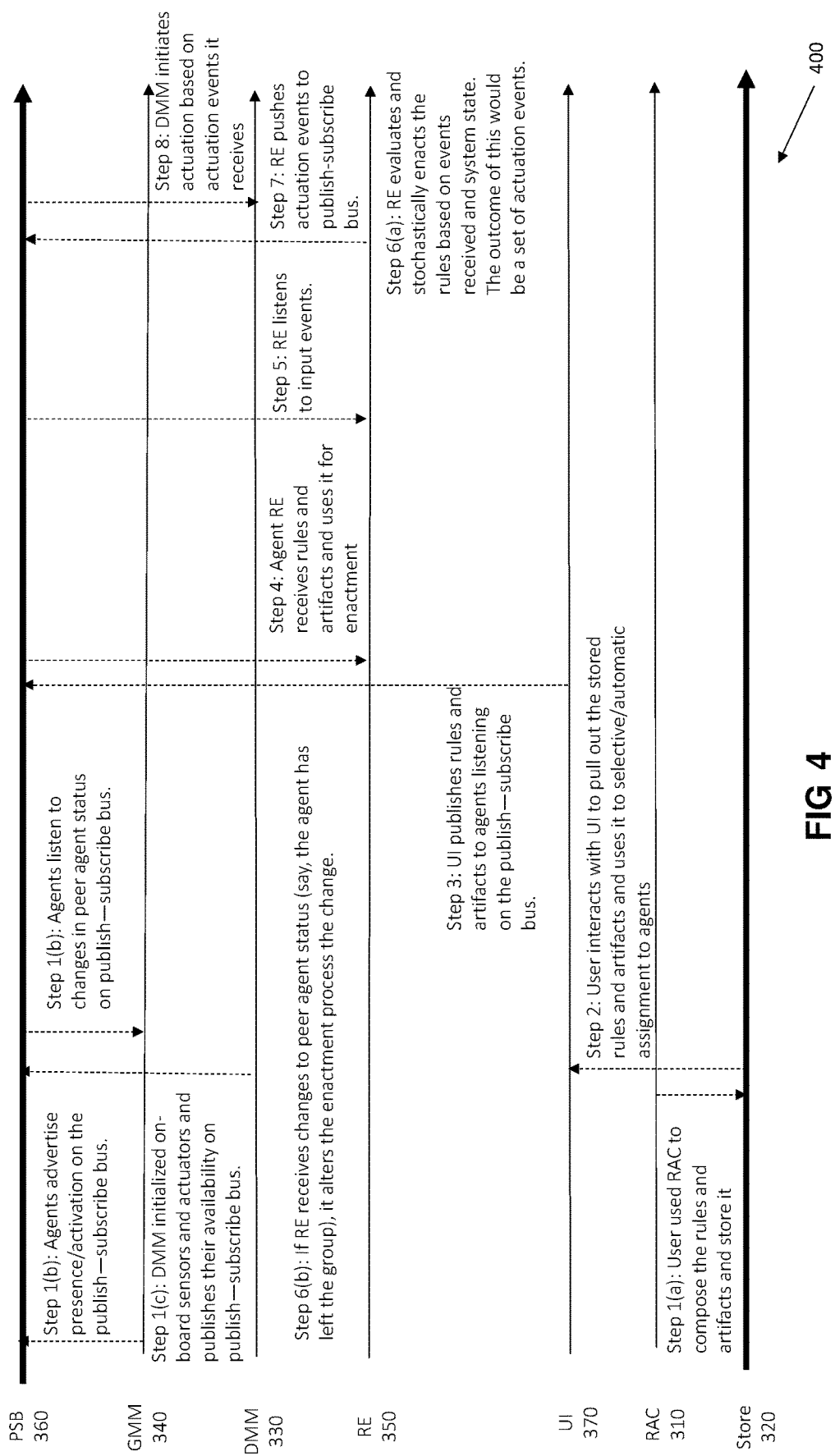
FIG. 4 illustrates a timing diagram of the operation of modules within exemplary toys in accordance with an embodiment of the present invention.

FIG. 4 illustrates a timing diagram 400 of the modules operation within exemplary toy 300 in accordance with the present disclosure. The timing diagram 400 shows the complete setup and operation of an exemplary connected toy 300 in an exemplary embodiment. During setup, on the setup features may be in operation, and, likewise, during runtime, only the runtime features may be in operation. In an exemplary embodiment, setup features may be configured simultaneously with runtime. In step 1(a), a User uses RAC 310 to compose the rules and artifacts and store the rules in Store 320. In step 1(b), agents or toys advertise their presence and activation on the PSB 360 using the GMM 340. Also, Agents or toys listen to changes in peer agent status on the PSB 360. In step 1(c) the DMM 330 initializes on-board sensors and actuators and publishes their availability on the PSB 360.

In step 2, a user interacts with UI 370 to publish rules to pull out stored rules and artifacts uses the UI 370 to selectively or automatically assign the rules and artifacts to agents. In step 3, UI 370 publishes rules and artifacts to agents or toys listening on the PSB 360. In step 4, the toy 400 RE 350 receives rules and artifacts and uses them for enactment.

In step 5, RE 350 listens to input events from the PSB 360. In step 6a, RE 350 evaluates and stochastically enacts the rules based on events received and system state. The outcome of this is a set of actuation events. At step 6b, if RE 350 receives changes to peer agent status (for example, the toy has left the group), it alters the enactment process for the change.

At step 7, RE 350 pushes actuation events to the PSB 360. At step 8, the DMM 330 initiates actuation events based on actuation events it receives.

Figure 5:
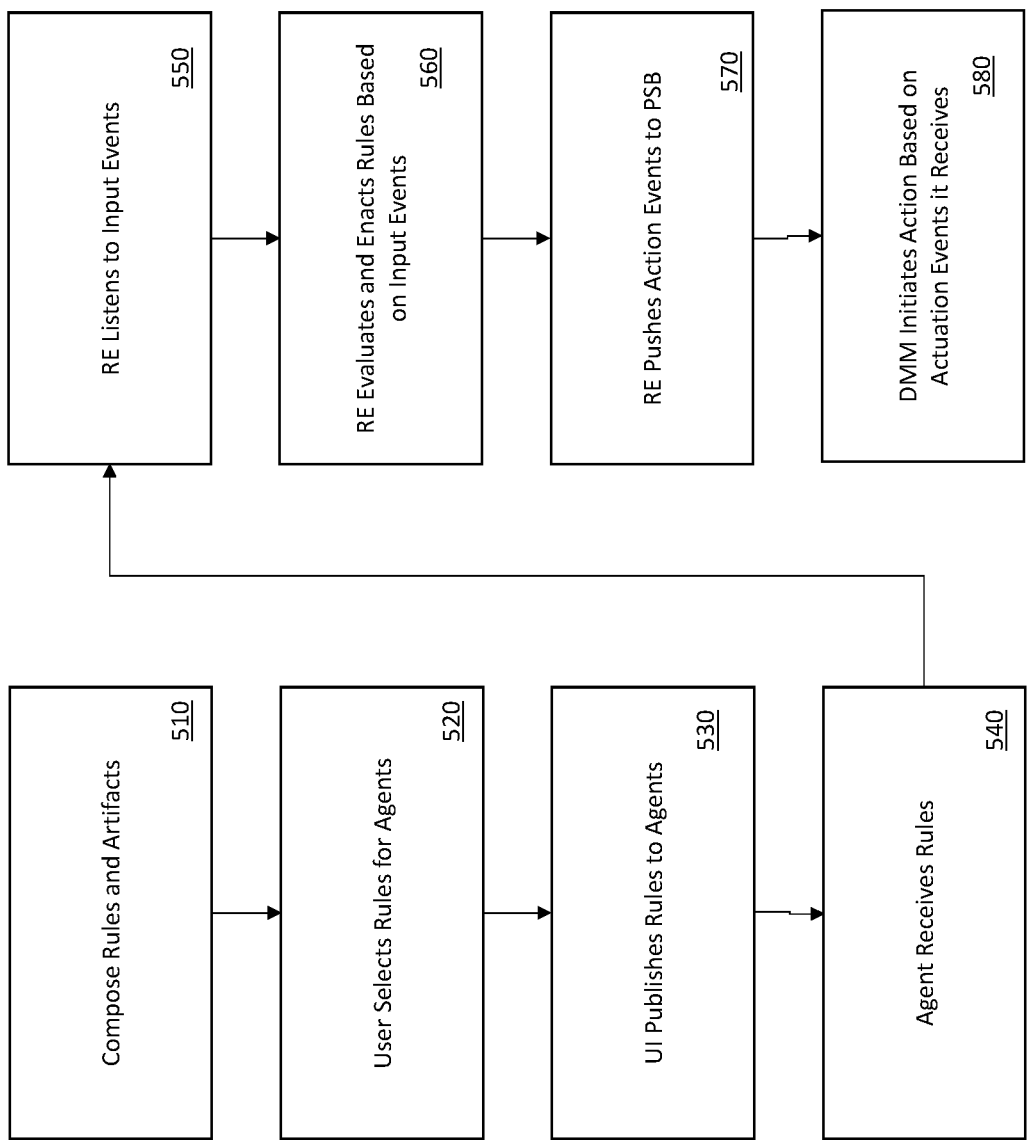
FIG. 5 illustrates a flow chart of an exemplary method implemented by a toy in accordance with an embodiment of the invention.

FIG. 5 illustrates a flow chart of an exemplary toy 300 in accordance with an embodiment of the invention. Stages 510-540 are a setup stage for an exemplary toy 300. Stages 550-580 are runtime stages for an exemplary toy 300. Rules and Artifacts are composed using RAC 310 and UI 370 as previously described above (stage 310). A user selects rules and artifacts for each agent or toy using UI 370 (stage 520) and publishes those rules to agents or toys (stage 530). The agent or toy receives the rules and stores them in Store 320 (stage 540).

The RE 350 of an exemplary toy 300 listen to the PSB 360 for input events (stage 550). The RE 350 evaluates and enacts rules based on the input events from the PSB 360 (stage 560). The RE 350 pushes action events to the PSB 360 (stage 570). The DMM 330 initiates action based on actuation events that it receives off the PSB 360 (stage 580).

Figure 6:
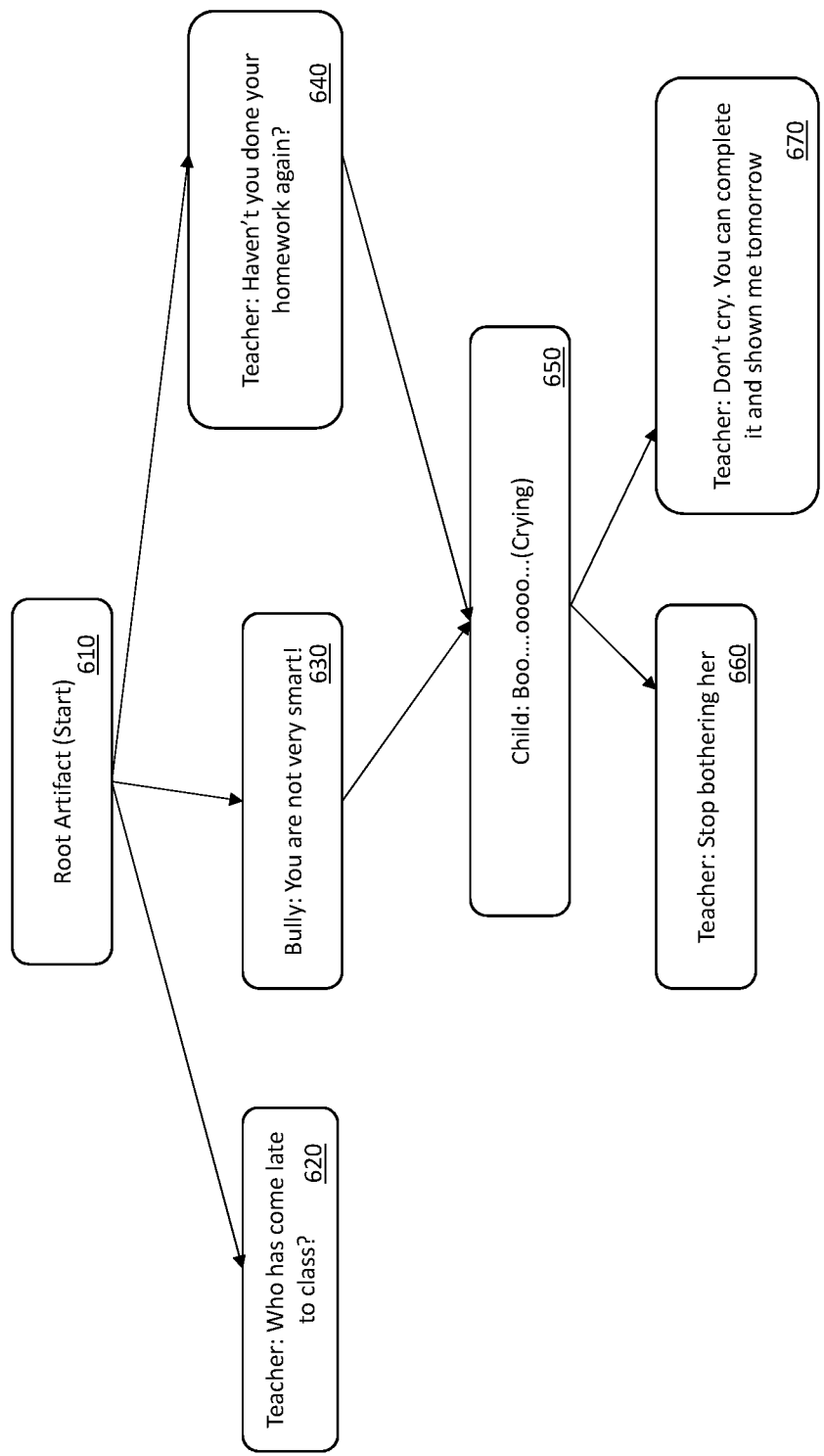
FIG. 6 illustrates an exemplary conversation between toys in accordance with the present invention.

FIG. 6 illustrates an exemplary conversation between toys in accordance with the present invention. The rules that apply to this conversation are replicated below:
r11 0.5: [teacher]-[asks_question]-[Q1, Q2] :- start
r12 0.5: [disagreeable person]-[states]-[S1]:- start
r21 1.0: [teacher]-[responds]-["Stop bothering her"]:- [disagreeable person]-[states]-[S1] happened-before [child]-[responds]-["Boo . . . oooo . . . "]
r22 1.0: [teacher]-[responds]-["Don't cry. You can complete it and shown me tomorrow"]:- [teacher]-[asks_question]-[Q2] happened-before [child]-[responds]-["Boo . . . oooo . . . "]

The conversation starts (block 610). Then, based on the rules, it is randomly determined whether the teacher or the disagreeable person speaks. The teacher may say, "Who has come late to class?" (block 620) or "Haven't you done your homework again" (block 640). Or, the disagreeable person may be the first to speak, saying "You are not very smart!" (stage 630). In response to the disagreeable person or the teacher asking about homework, the child may start crying (stage 650). Because the toy 300 has memory for what has happened in the past, the teacher will say "Stop bothering her," if the crying was a result of the disagreeable person (block 660). If the crying was the result of the teacher's inquiry into homework, the teacher will say "Don't cry. You can complete it and show it to me tomorrow" (block 670).

Figure 7:
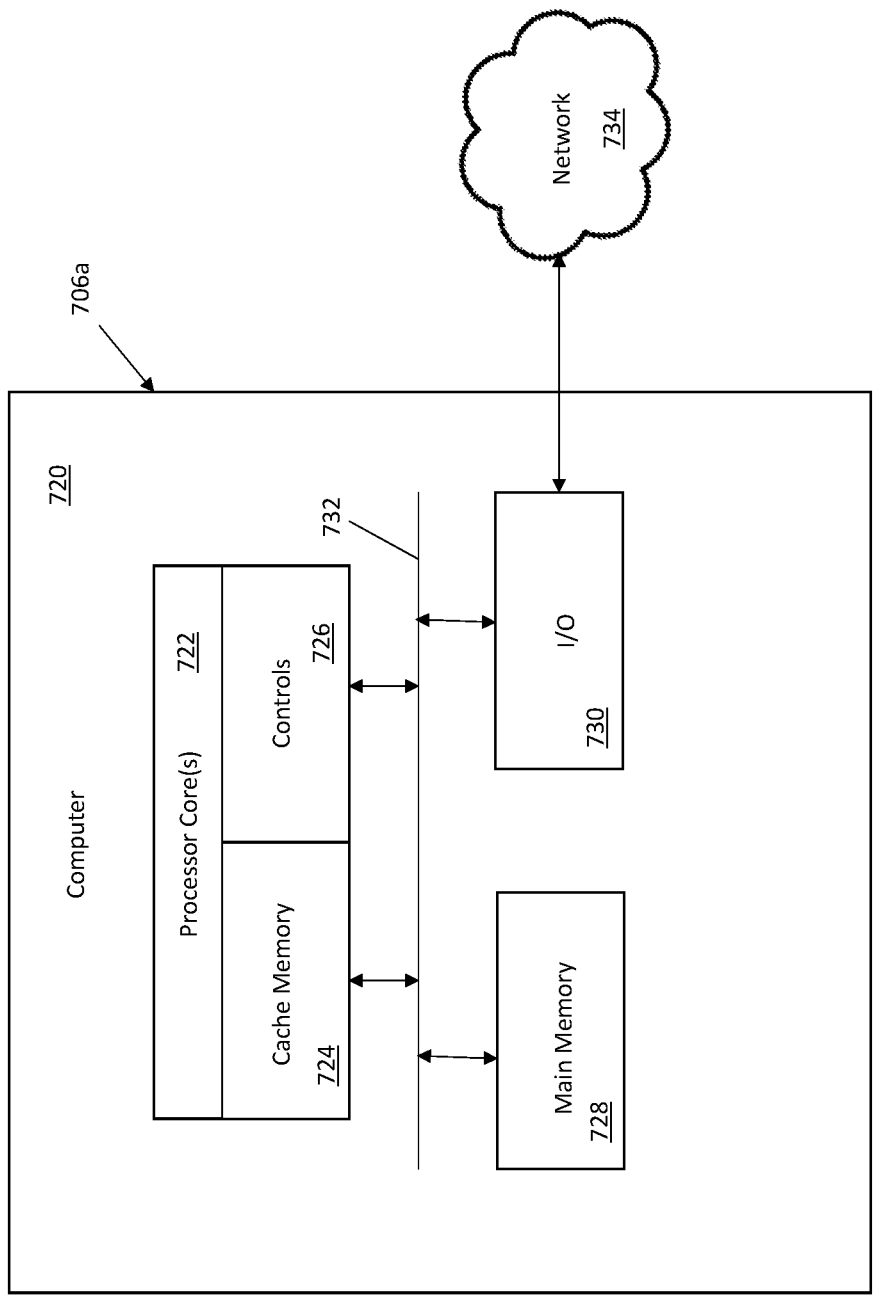
FIG. 7 illustrates a more detailed example of how a socially connected toy may be implemented as a computer system including an exemplary computing device configured to provide social learning using connected toys in accordance with the present invention.

FIG. 7 illustrates a more detailed example of how socially connected toy 300 may be implemented as a computer system 706A including an exemplary computing device ("computer") 720 configured to provide social learning using connected toys 300 (shown in FIG. 3) in accordance with the present invention. In addition to computer 720, exemplary computer system 706A includes network 734, which connects computer 720 to additional systems (not depicted) and may include one or more wide area networks (WANs) and/or local area networks (LANs) such as the Internet, intranet(s), and/or wireless communication network(s). Computer 720 and additional systems are in communication via network 734, e.g., to communicate data between them.

Exemplary computer 720 includes processor cores 722, main memory ("memory") 728, and input/output component(s) 730, which are in communication via bus 732. Processor cores 722 includes cache memory ("cache") 724 and controls 726, which include components configured to communicate among toys 300 (shown in FIG. 3). Cache 724 may include multiple cache levels (not depicted) that are on or off-chip from processor 722. Memory 724 may include various data stored therein, e.g., instructions, software, routines, etc., which, e.g., may be transferred to/from cache 724 by controls 726 for execution by processor 722. Each of the modules previously described with respect to FIG. 3 are stored in Memory 724. Input/output component(s) 730 may include one or more components that facilitate local and/or remote input/output operations to/from computer 720, such as a display, keyboard, modem, network adapter, etc. (not depicted).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, by a processor, input events;
evaluating and enacting rules, by the processor, based on the received input events, where the rules include stochastic rule enactments comprising an introduction of a deliberate uncertainty in an outcome of at least one of the rules;
pushing, by the processor, action events that result from the evaluation and enactment of the rules; and
initiating, by the processor, action events received.

2. The computer-implemented method of claim 1, wherein a rules engine running on the processor receives the input events.

3. The computer-implement method of claim 1, wherein a rules engine running on the processor evaluates and enacts the rules.

4. The computer-implement method of claim 3, wherein the rules further include stochastic elements that include probabilistic elements, wherein there is a probability that a particular rule will be implemented.

5. The computer-implemented method of claim 1, wherein the rules further include temporal operators selected from the group consisting of happened-before, next, until, and global.

6. The computer-implemented method of claim 1, further comprising setting up, by the processor, the rules.

7. The computer-implemented method of claim 6, wherein setting up the rules further comprises composing the rules using a rules and artifacts composition module.

8. The computer-implemented method of claim 6, wherein setting up the rules further comprises selecting the rules to be implemented using a user interface.

9. The computer-implemented method of claim 8, wherein setting up the rules further comprises publishing the rules to an agent.

10. A system comprising:
a memory;
a processor coupled to the memory, the processor operable to execute instructions stored in the memory, the instructions causing the processor to:
receive input events;
evaluate and enact rules based on the received input events, where the rules include stochastic rule enactments comprising an introduction of a deliberate uncertainty in an outcome of at least one of the rules; and
push action events that result from the evaluation and enactment of the rules.

11. The system of claim 10, wherein the instructions further cause the processors to initiate action events received.

12. The system of claim 10, wherein a rules engine running on the processor receives the input events.

13. The system of claim 10, wherein a rules engine running on the processor evaluates and enacts the rules.

14. The system of claim 10, wherein the rules further include stochastic elements that include probabilistic elements, wherein there is a probability that a particular rule will be implemented.

15. The system of claim 10, wherein the rules further include temporal operators selected from the group consisting of happened-before, next, until, and global.

16. The system of claim 10, further comprising instructions for setting up, by the processor, the rules.

17. The system of claim 16, wherein setting up the rules further comprises instructions for composing the rules using a rules and artifacts composition module.

18. The system of claim 16, wherein setting up the rules further comprises selecting the rules to be implemented using a user interface.

19. The system of claim 18, wherein setting up the rules further comprises instructions for publishing the rules to an agent.

20. A computer program product for socially, connectable agents, the computer program product comprising a computer readable storage medium having program instructions embodied therewith, wherein the computer readable storage medium is not a transitory signal per se, the program instructions executable by a computer, to cause the computer to perform a method comprising:
receiving input events;
evaluating and enacting rules based on the received input events, where the rules include stochastic rule enactments comprising an introduction of a deliberate uncertainty in an outcome of at least one of the rules;
push, by the processor, action events that result from the evaluation and enactment of the rules; and
initiate, by the processor, action events.

* * * * *